(No Model.) 2 Sheets—Sheet 1.
A. ELLIS.
CULTIVATOR.
No. 432,128. Patented July 15, 1890.
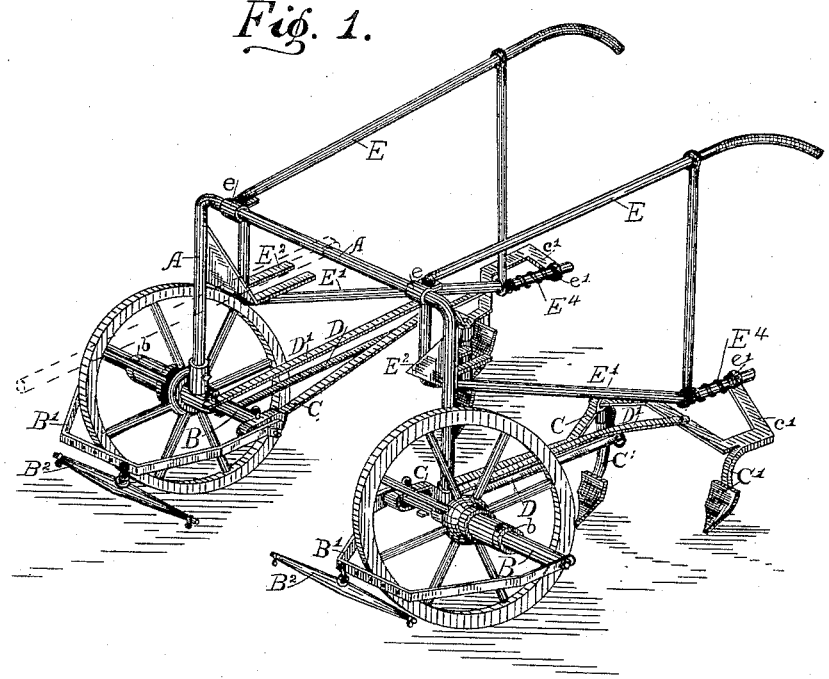
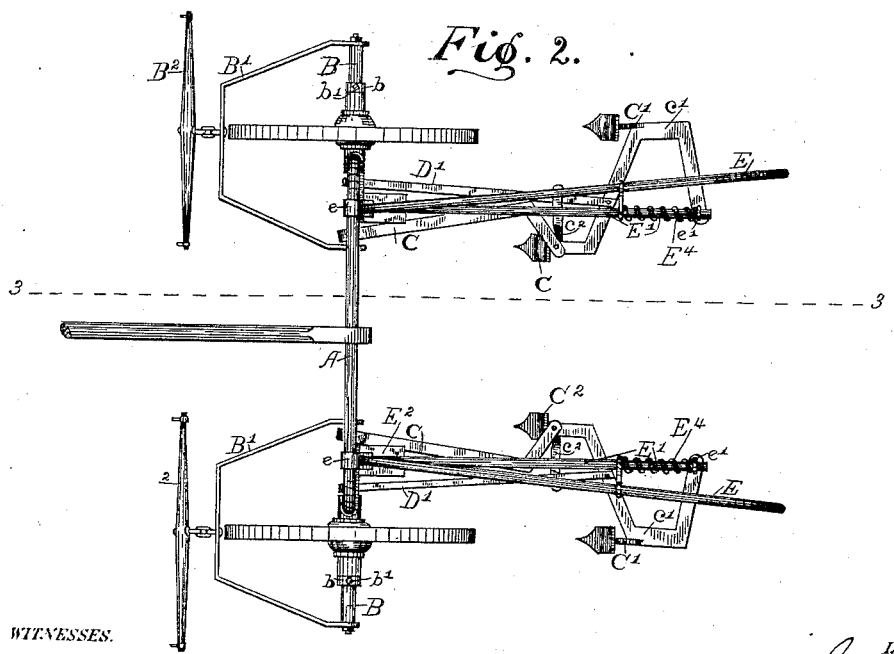
WITNESSES.
Dean Rhodes
J. Walsh
INVENTOR.
Augustin Ellis,
per E. W. Bradford.
ATTORNEYS.
THE NORRIS PETERS CO., PHOTO-LITHO., WASHINGTON, D. C.

(No Model.) 2 Sheets—Sheet 2.

A. ELLIS.
CULTIVATOR.

No. 432,128. Patented July 15, 1890.

WITNESSES.
Dean Rhodes.
J Walsh

INVENTOR.
Augustin Ellis,
per E. W. Bradford,
ATTORNEYS.

UNITED STATES PATENT OFFICE.

AUGUSTIN ELLIS, OF BEDFORD, INDIANA.

CULTIVATOR.

SPECIFICATION forming part of Letters Patent No. 432,128, dated July 15, 1890.

Application filed October 1, 1889. Serial No. 325,682. (No model.)

*To all whom it may concern:*

Be it known that I, AUGUSTIN ELLIS, a citizen of the United States, residing at Bedford, in the county of Lawrence and State of Indiana, have invented certain new and useful Improvements in Cultivators, of which the following is a specification.

My said invention relates to that class of cultivators in which the plows are adjusted toward and from each other. My principal object is to enable such adjustment to be easily and equally made, and to maintain an even and equal draft upon the plows without reference to their position. Said invention will first be fully described, and then particularly pointed out in the claims.

Figure 3:
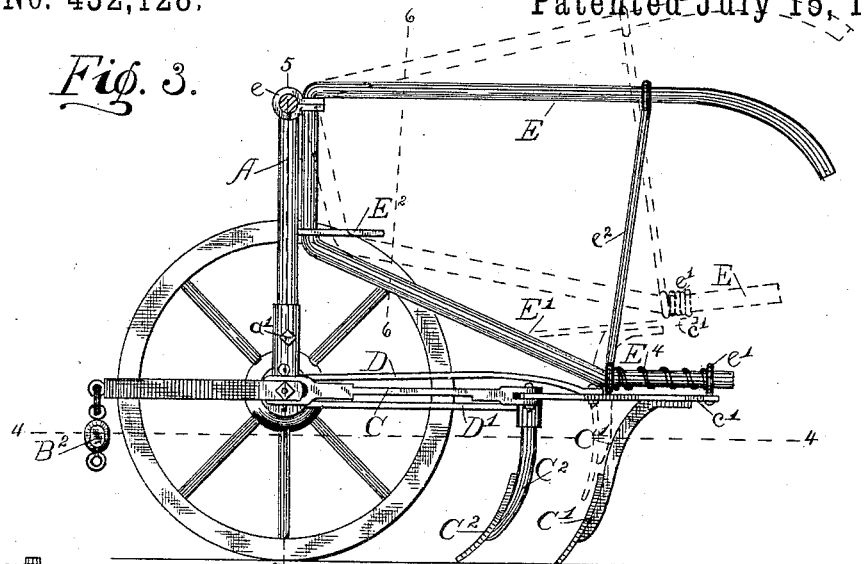
Figure 4:
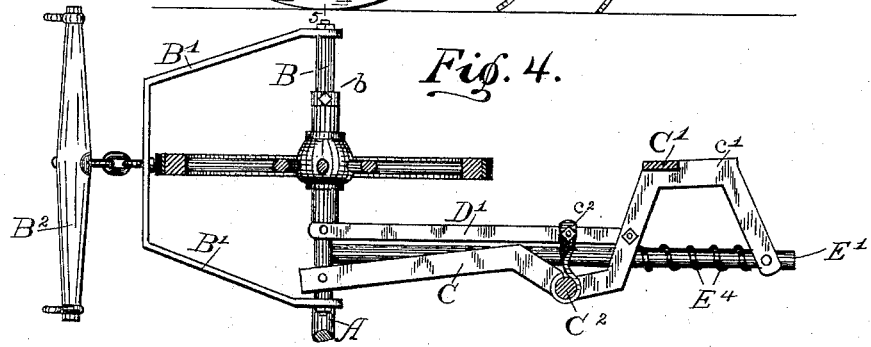
Figure 5:
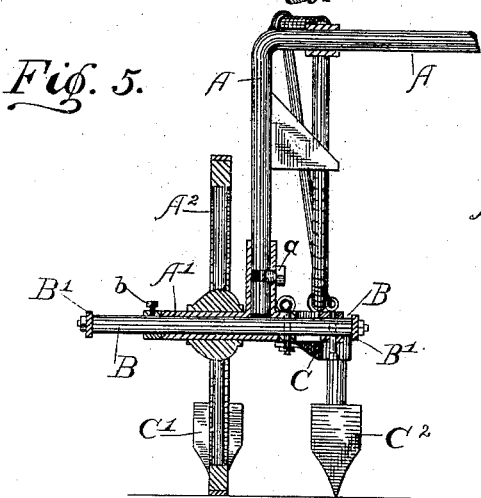
Figures 6, 7:
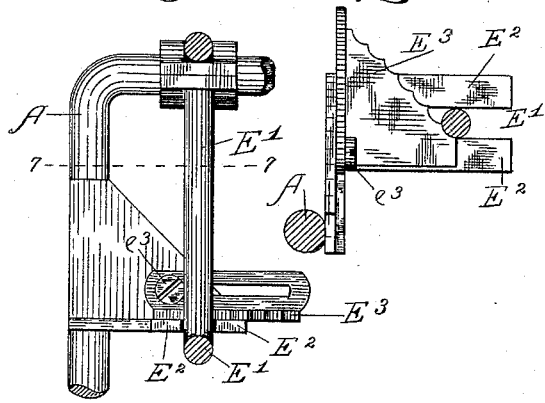

Referring to the accompanying drawings, which are made a part hereof, and on which similar letters of reference indicate similar parts, Figure 1 is a perspective view of a cultivator embodying my said invention; Fig. 2, a top or plan view of the same; Fig. 3, a central vertical section looking upwardly from the dotted line 3 3 in Fig. 2; Fig. 4, a horizontal sectional view, on an enlarged scale, looking upwardly from the dotted line 4 4 in Fig. 3; Fig. 5, a vertical sectional view looking toward the right from the dotted line 5 5 in Fig. 3; Fig. 6, a detail view looking toward the left from the dotted line 6 6 in Fig. 3, and Fig. 7 a horizontal sectional view looking downwardly from the dotted line 7 7 in Fig. 6.

In said drawings, the portions marked A represent the arched axle to my improved cultivator; B, rods which pass through the hollow ends or sleeves attached to said arched axle; C, the plow-beams attached to said rods; D D', connecting-rods also attached to said rods B at one end and at the other end to cranks on the plow-shanks, and E the plow-handles.

The arched axle A has a sleeve or hollow portion A' attached to each end, upon which sleeves or hollow portions the ordinary wheels $A^2$ are mounted. These hollow portions are preferably so attached to the lower end of the main portion of said axle as to swivel thereon, so that the wheels may be in line with the line of travel notwithstanding that one end of the axle may be in the rear of the other. This feature is of the most service when the cultivator is used in the "tongueless" form, and is best shown in the detail view Fig. 5, in which a circumferential groove is shown near the lower end of the vertical portion of the axle, with which a stud or pin $a$, which passes through the sleeve surrounding it, engages. When it is desired to hold these parts rigidly in the same relation, (as when the tongue is used,) it can be effected by turning up this stud $a$, which, for this purpose, is preferably made in the form of a set-screw. A tongue is shown in Figs. 1 and 2; but this cultivator is as well or better adapted for use as a tongueless cultivator, in which case the ordinary "shoes" for aiding in supporting the plows when out of service are employed instead of the tongue.

The rods B are mounted in the sleeves A' and extend through to each side thereof, and are adapted to move back and forth in said sleeves. Collars $b$ are secured on these rods, and by means of set-screws $b'$, as shown, are secured at any desired point thereon, and thus hold the rods in any desired relation to the sleeves thereon. To the outer ends of these rods B are secured draft-bars B', which preferably loop around the forward edges of the wheels $A^2$, and in front of said wheels have straight portions of equal or greater length than the extreme distances the rods are permitted to move through the sleeves. To these straight portions the whiffletrees $B^2$ are attached, and as there are a number of holes or eyes in these straight portions, or equivalent hooks thereon, the whiffletree may be so attached as to be directly in front of the wheel, without reference to the point to which the rod has been adjusted in the sleeve, it being only necessary to change the attachment of the whiffletrees as said adjustment is varied. This is a simple and effective way of accomplishing a very desirable result.

The plow-beams C are pivoted to the inner ends of the rods B, and extend back to the point where the first plow is attached. The plows C' and $C^2$ are attached to the plow-beams by means of crank-arms $c'$ $c^2$, which are pivoted to the rear end of the plow-beams. The position of these plows are regulated by the connecting-rods, which will be presently explained. The crank-arms $c'$ are practically extensions of the plow-beams to the extent that they carry the plows attached thereto to the rear of the other plows, as shown. They also extend still farther and carry eyes for the lifting-bars, as will be presently explained.

The connecting-rods D and D' are pivoted to the rods B at their forward ends, and extend back and are respectively pivotally connected to the crank-arms $c'$ and $c^2$, to which the plows, as before explained, are rigidly connected. The operation is, as the plow-beams are swung from side to side, that these connecting-rods will hold the faces of the plows to the front, notwithstanding that the plow-beams may be swung to an angle with the direction in which the cultivator is traveling. This result is achieved because of having these plow-beams and rods and crank-pins and the various pivot-points so arranged that said plow-beams and rods will maintain a substantially parallel relation without reference to the angle with the axle to which they are moved, as indicated best by Figs. 1 and 4.

The handles E are mounted upon the axle A, and are so secured thereon by means of clips $e$, or otherwise, that they may be moved in the various positions in relation thereto, as indicated by the dotted lines in Fig. 3. Attached to these handles are lifting-bars E', which extend down and pass through rings or loops $e'$ on the outer ends of the crank-arms $c'$, and thus, by lifting said handles, the plow-beams and plows are also lifted and assume the position shown by the dotted line in Fig. 3, the free ends of the lifting-bars E' sliding readily back and forth through the loops $e'$. Surrounding the portion of the lifting-bar E', which is between the rings or loops $e'$ and the vertical bar or rods $e^2$, which connect them to the handles, are springs $E^4$, which exert a certain force upon the plow-beams, and thus hold the plows into the ground, unless they are thrown out by a greater force than that of said springs. In the construction shown the forward vertical portion, which unites the handles and the lifting-bars, passes down between arms $E^2$, extending out from the axle A, which arms serve as guides in the movement of this part of the device. When the handles, and consequently the lifting-bars, are lifted, they can be held in elevated position by sliding behind the vertical portions on top of the guide-arms $E^2$, wedges or stays $E^3$, against which said vertical portions may rest, and thus the plows may be held in elevated position when desired, as when driving the machine from one place to another. The union of these parts in this form secures that the strain of shifting the plows shall come mostly on the lifting-bars E' instead of altogether upon the handles E, as in many constructions. In Figs. 6 and 7 I have shown a construction of wedge for this purpose, which is quite convenient. As shown in Fig. 7, it is secured to the vertical part of the plate, from which the guide-arms $E^2$ are formed, by a set-screw $e^3$, passing through a slot therein. The rear side of said wedges $E^3$ has a series of serrations adapted to fit against the vertical portions of the bars E', and thus by moving said wedges to any desired point a corresponding elevation of the plows may be secured, and by tightening the set-screws $e^3$ they may be securely fastened at such point. This forms a very convenient means of adjusting the height to which the plows shall be held.

Having thus fully described my said invention, what I claim as new, and desire to secure by Letters Patent, is—

1. The combination, in a cultivator, of the axle terminating at the lower ends in sleeves, the wheels mounted upon said sleeves, bars or rods passing through said sleeves and adjustable therein, and the plow-beams attached to said bars or rods.

2. The combination, in a cultivator, of the plow-beams, crank-arms connected thereto carrying the plows, and connecting-rods connecting the extending portions of said crank-arms and that portion of the axle to which the plow-beams are also connected, substantially as set forth.

3. The combination, in a cultivator, of the transverse portion forming part of or attached to the axle, the plow-beams C, pivoted to said transverse portion, crank-arms $c'$ and $c^2$, attached to the plows, and connecting-rods D and D', pivoted to the transverse portion and also to said crank-arms, substantially as and for the purposes set forth.

4. The combination, in a cultivator, with the plow-beams and the plows thereon, and the axle, of the handles E, the lifting-rods E', united thereto, the ends whereof pass through rings or loops $e'$ upon the plow-beams or parts attached thereto, substantially as and for the purposes set forth.

5. The combination, in a cultivator, with the plow-beams, plows, axle, and handles, of lifting-rods, the ends whereof pass through loops on the plow-beams, and springs $E^4$, interposed between stops on said plow-beams (as said loops,) and similar stops on said lifting-rods, substantially as described.

6. The combination, with the axle, plow-beams, handles, and lifting-rods of a cultivator, of wedge portions $E^3$, adapted to be inserted between vertical portions of the lifting-rods and the axles or parts attached thereto, whereby the plows may be held in elevated positions, substantially as set forth.

7. The combination, in a cultivator, of the axle A, handles E, guide-arms $E^2$, lifting-rods E', and wedges $E^3$, substantially as and for the purposes set forth.

8. The combination, in a cultivator, of the bars or rods B, adjustable relatively to the wheels, and to which the plow-beams are attached, and the loop portions B', extending around in front of the wheels and attached to the ends of said bars or rods and provided with several attaching-points, and whiffle-trees adapted to be attached to said loop portions at any of said attaching-points, whereby the point of draft on said loop portions may be made to bear the same relation to the wheels at all times, notwithstanding the adjustment of said bars or rods relatively to said wheels, substantially as set forth.

9. The combination, in a cultivator, of the arched axle, sleeves pivotally secured to the vertical sides of said axle, wheels mounted thereon, bars or rods passing through said sleeves and capable of an endwise movement therein, and plow-beams attached to said bars or rods.

10. The combination, in a cultivator, of the arched axle, sleeves attached to the lower ends of the vertical sides of said axle, wheels mounted thereon, bars or rods passing through said sleeves and adjustable therein, the plow-beams attached to said bars or rods, and draft-rods, (as the looped portions B',) also attached to said bars or rods and extending forward in front of the wheels.

In witness whereof I have hereunto set my hand and seal, at Indianapolis, Indiana, this 26th day of September, A. D. 1889.

AUGUSTIN ELLIS. [L. S.]

Witnesses:
E. W. BRADFORD,
J. WALSH.